Dec. 11, 1928.  1,694,543

H. R. HOCKLEY ET AL
APPARATUS FOR OPERATING AND CONTROLLING THE DOORS OF
TRAMWAY OR LIKE VEHICLES
Filed July 26, 1927   3 Sheets-Sheet 2

Inventors
Horace Reginald Hockley
and Hedley Bertram White
by Darby & Darby
their attorneys Dec. 11, 1928.
H. R. HOCKLEY ET AL
1,694,543
APPARATUS FOR OPERATING AND CONTROLLING THE DOORS OF
TRAMWAY OR LIKE VEHICLES
Filed July 26, 1927
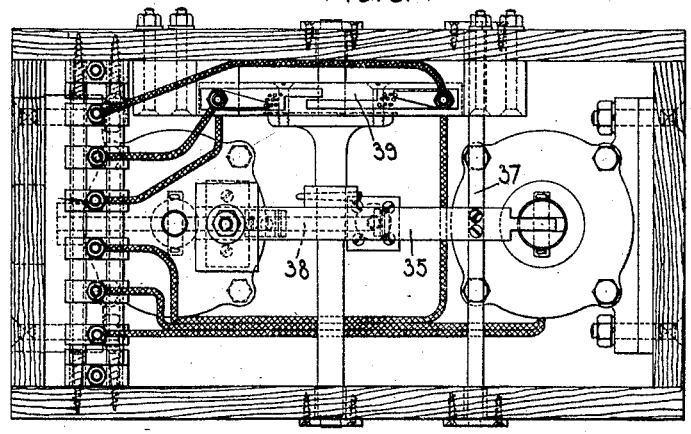
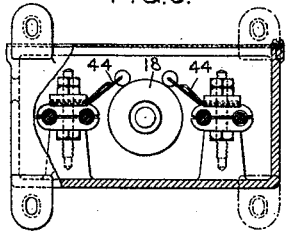
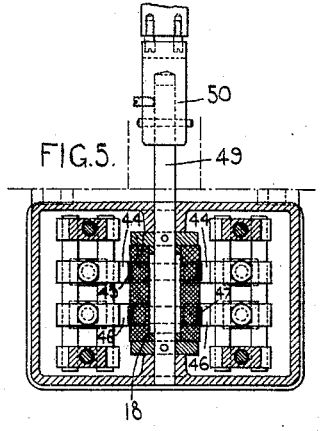
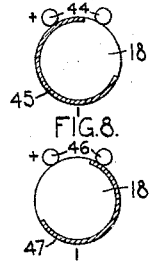
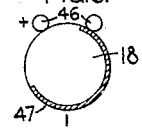
Inventors
Horace Reginald Hockley
and Hedley Bertram White
by Darby & Darby
their attorneys Patented Dec. 11, 1928.

1,694,543

UNITED STATES PATENT OFFICE.

HORACE REGINALD HOCKLEY AND HEDLEY BERTRAM WHITE, OF SLOUGH, ENGLAND, ASSIGNORS TO THE NATIONAL PNEUMATIC COMPANY, OF NEW YORK, N. Y., A CORPORATION OF WEST VIRGINIA.

APPARATUS FOR OPERATING AND CONTROLLING THE DOORS OF TRAMWAY OR LIKE VEHICLES.

Application filed July 26, 1927, Serial No. 208,540, and in Great Britain September 8, 1926.

This invention has reference to systems of and apparatus for operating and controlling the doors of electric tramway cars and other vehicles.

The specification of the application for Letters Patent, Serial No. 126,994, filed August 4th, 1926, Patent No. 1,644,380, October 4, 1927, by Horace Reginald Hockley, describes a door operating system and apparatus embodying features and elements that are also embodied in the system and apparatus according to the present invention but an outstanding difference between the control of the pneumatic door operating engines by the driver according to the present invention as distinguished from that described in the prior specification is that it is an all electrical control and functions automatically with the braking movements of the traction controller and the movements of an electrically actuated switch. The system according to the present invention is such that upon the driver moving the controller handle to apply his electric or other brake and the car coming to rest, the entrance door at his near side opens immediately; if passengers desire to alight, they may open the near side exit door by walking on to the appropriate treadle plate, as is the case in the apparatus according to the earlier specification. While the car is running, however, passengers cannot alight from the exit doors, nor can they enter the car by the entrance door, due to the action of an interlocking switch the operation of which is controlled by the controller. At the termination of each trip, as in the previous apparatus, the driver has only to operate the change over switches and the shut-off or isolating cock, the functioning of the doors being entirely out of the control of the driver except for the operation of the main traction controller.

The improved apparatus is designed to provide a simple system wherein the valves, pipes, and other pneumatic parts are reduced to a minimum having regard to requirements necessary to provide for the safety of passengers, and for the prevention of unauthorized entry to or exit from the vehicle.

The doors are operated pneumatically, as heretofore, and their operation is controlled electrically, the construction and arrangement of the various parts being such that should a failure of current or air pressure occur all the doors of the vehicle are released but not actually opened, and may then be opened by hand by the passengers.

The invention principally consists in a system of, or apparatus for, operating and controlling the doors of an electric tramway car or other vehicle of the kind in which the doors are operated pneumatically and the supply of compressed air to their operating motors is controlled electrically, wherein the circuits of the electrical means controlling the supply of air to the door motors are, during the normal running of the car or vehicle, controlled by movements of the main controller handle, including movements of the said handle to effect the application or release of the electric or other brake of the car or vehicle. Further according to the invention the apparatus is such that movements of the controller handle cause operation of an electrically actuated switch which in turn controls the circuits of the electrical means controlling the air supply to the door motors.

Further features of the invention are pointed out in the appended claims and are described hereinafter with reference to the accompanying drawings, in which:—

Fig. 3 is a plan with the cover of the casing removed, of the electrically actuated switch device above referred to and designated 17 in Fig. 1.

Figs. 5 and 6 show in elevation, partly sectional, and in plan, respectively, a drum switch associated with the main or traction controller and hereinafter described, and Figs. 7 and 8 are diagrammatic illustrations of contacts of the drum switch which will be hereinafter referred to.

Figure 1:
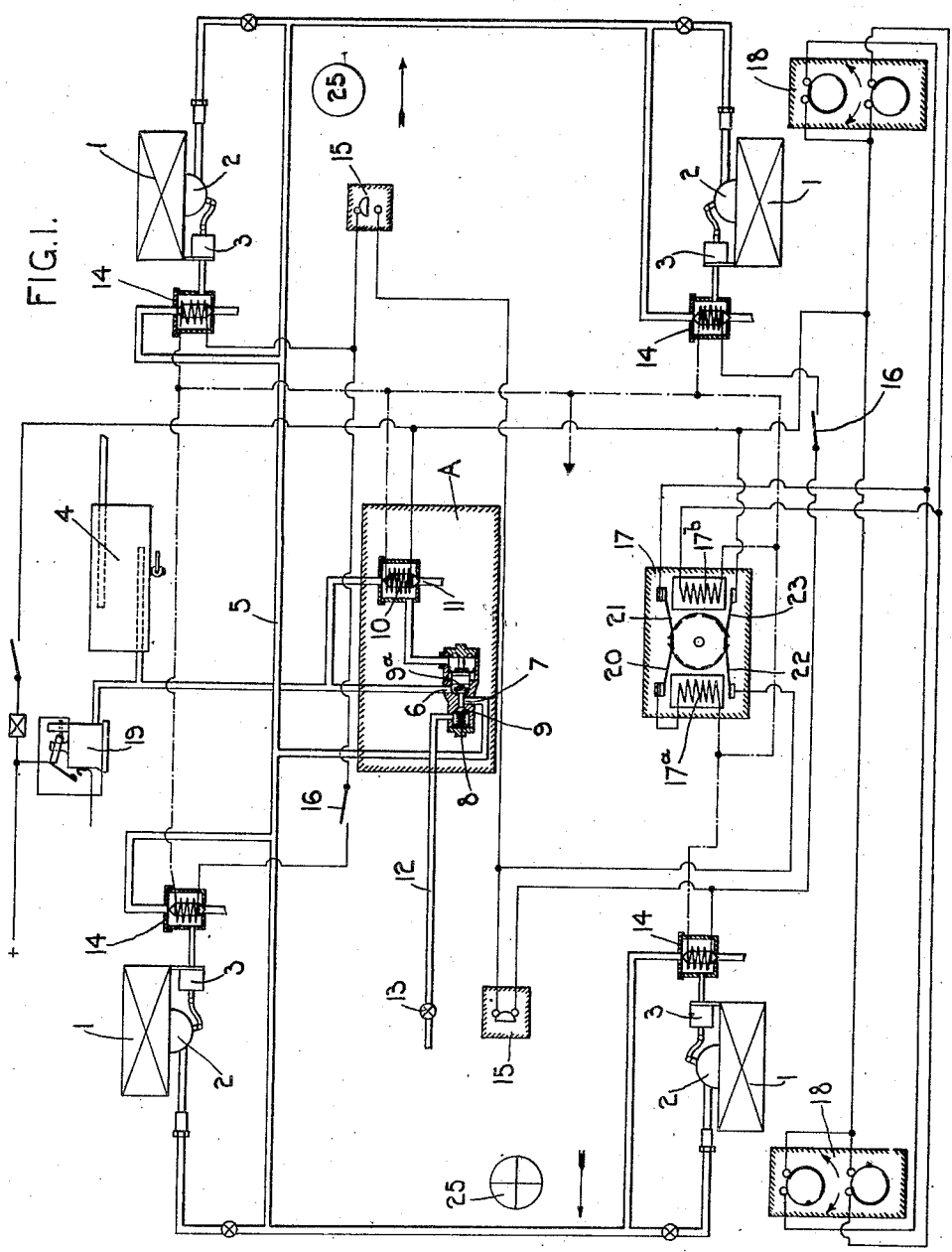
Fig. 1 is a diagrammatic illustration of the piping and wiring for a one-man electrically propelled tramcar having four doors, namely an entrance and an exit door on each side of the vehicle.
Figure 2:
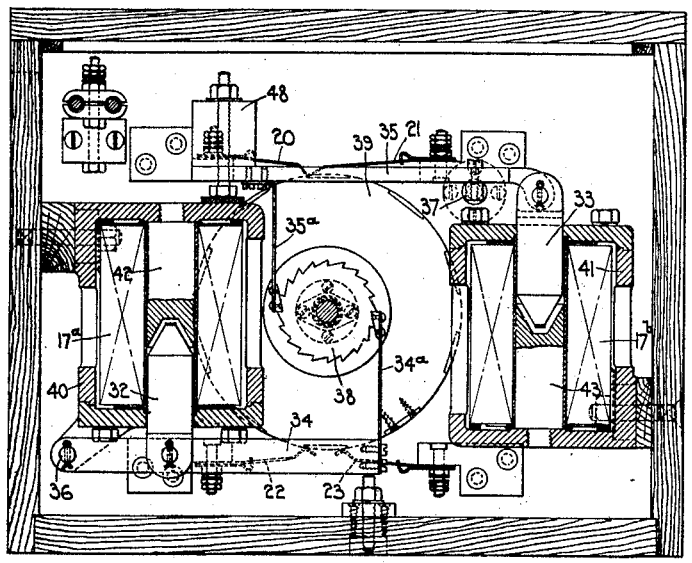
Fig. 2 is an elevation, partly sectional.

Referring to the drawings, the embodiment of the invention therein illustrated comprises a pneumatic door engine 1 for each entrance and exit door, each door engine being controlled by a corresponding valve 2, actuated by a valve puller 3, the compressed air for the actuation of the door engines and valve pullers, which are of known construction, being supplied from the main reservoir and water trap 4 on the car through suitable valves. From the main reservoir 4 air is constantly fed by a supply pipe to a port 6 of an electro-pneumatic valve combination called the no-volt electro-pneumatic valve combination indicated generally at A, and subject to the control of this valve, via a port 7 thereof, to the door engine supply or feed pipe 5 extending from end to end of the car.

Figure 4:
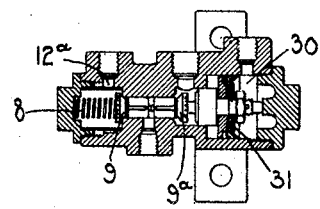
Fig. 4 shows in section the pneumatically operated valve device of an electro-pneumatic valve combination hereinafter described and designated A in Fig. 1.

The no-volt electro-pneumatic valve comprises an ordinary electro-pneumatic valve of known construction connected by a pipe to the operating cylinder 30 of a pneumatic relay valve shown in Fig. 4, and the said electro-pneumatic valve controls the admission of compressed air to and its exhaust from the piston 31 of the relay valve, the arrangement being such that whilst the magnet of the electro-pneumatic valve is energized it shuts off the supply of air to the cylinder of the pneumatic relay valve and thus allows a spring 8 to press the valve 9 against its seating and thereby shut off the exhaust port 12$^a$ of the valve while at the same time causing the valve 9$^a$ to open and connect the supply pipe 5 to the main reservoir 4. When the said magnet is de-energized, by a failure of the line current, the plunger 10 drops and closes the exhaust port 11 thus allowing pressure air to pass into the operating cylinder 30 of the pneumatic relay valve forcing the piston 31 over, seating valve 9$^a$ and causing the supply of air to be shut off from the door engine feed pipe 5 and to open the said feed pipe to exhaust by way of the valve 9, which will be unseated, port 12$^a$ and the pipe 12, provided that the straightway cock 13 is open, but if this cock 13 is closed no change whatever will take place in the door engine system by this valve movement.

The air supply for operating the valve pullers 3 of the door engines 1 is controlled by electro-pneumatic valves 14 of known construction one for each of the four valve pullers, these electro-pneumatic valves being so arranged that when their magnets are energized air is exhausted from the valve puller cylinders and the valves actuated by the pullers are in a position to admit air to the door engines to open the doors, whereas when the magnets are de-energized air is admitted to the valve puller cylinders (which is the normal running condition), and the valves actuated by the pullers are in the position to admit air to the door engines to hold the doors closed.

The electrical portion of the door control apparatus comprises in addition to the no-volt valve combination A and the door engine electro-pneumatic valves 14, a change-over switch 15 at each end of the car under the control of the driver; treadle switches 16 in the circuits of the electro-pneumatic valves 14 relating to the exit doors; an electrically operated interlocking switch 17 with its various contacts; controller operated drum switches 18 each with two pairs of contacts, and a control governor 19 which serves to break the electric feed to the main controllers when air is not available.

The change-over switches 15 and the treadle switches 16 are constructed and function in a known manner and are similar to the change-over switches and treadle switches described in the above cited patent above referred to.

The electrically operated interlocking switch 17 consists of two coils 17$^a$, 17$^b$ having plungers 32, 33 which, on the coils being energized, move pawl levers 34, 35, pivoted at 36, 37 respectively, and produce a rotational movement of a ratchet wheel 38 and a contact drum 39 to which the ratchet wheel 38 is fixed. One of these coils 17$^a$ is intended to be energized when the master controller is halfway between the off position and the first notch of the series position or any intermediate position and the other coil 17$^b$ is intended to be energized when the master controller is at the second or other desired notch of the magnetic brake position. The interlocking switch mechanism 17 is housed in a casing and the two pots 40, 41 for the coils may be identical in shape and contain a coil in each. The movable cores 32, 33 are caused to strike the fixed cores 42, 43 and to produce oscillation of the pawl levers 34, 35 respectively. One coil, namely the coil 17$^a$ on the left-hand side, is connected to contacts 44 on the drum switch 18 and is energized by the movement of the controller handle into the power positions by the contact strip 45 on the drum 18 bridging the contacts 44 while the other coil, namely the coil 17$^b$ on the right-hand side, is connected to contacts 46 on the said drum switch and is energized by the movement of the controller handle into the brake position, the contacts 46 being then bridged by the strip 47 on the drum 18.

A source of current is connected to the top right hand contact 21 which presses against the contact drum 39, and with the coils 17$^a$, 17$^b$ in the de-energized position, as assuming the car to be travelling towards the left (the left-hand change-over switch 15 being closed as shown), on the controller handle at the left of the diagram, Fig. 1, being moved half-way towards the first notch of the power position, a circuit is completed at contacts 44, 45 of the drum switch 18 (the top contacts of those shown in diagram, Fig. 1)

and current is caused to flow across the two fingers 21 and 20 and thence through the coil 17ª to negative. This results in raising the corresponding pawl lever 34 and through the pawl 34ª and ratchet wheel 38 turning the contact drum in an anti-clockwise direction through eighteen degrees. This automatically results in the breaking of the circuit of the power coil 17ª and at the same time breaks the contacts 22 and 23 connected to the line. The controller handle may be moved into power positions and into the off position many times after this operation has once been completed, but the power coil 17ª will not again be energized without moving the controller handle into the brake position, owing to the fact that the power coil is now open circuited at the contacts 20 and 21. On moving the controller handle into the brake position, and arriving at the second or other desired notch of the brake, contact is made by the contacts 46, 47 at a drum switch 18 (the lower contacts in the diagram) so that current flows through the brake coil 17ᵇ thus energizing the coil and causing it to pull down the movable core 33 and by the pivoting of the corresponding pawl lever 35 about its shaft 37 the outer end of the said pawl lever and the pawl 35ª are raised, together with a weight 48 fixed on the pawl lever 35 and this coil 17ᵇ will hold the apparatus in this position during the whole of the time that the controller handle is between the second notch of the brake position and full brake position. On returning the controller handle past the second notch the coil 17ᵇ will be de-energized and the weight 48 will depress the pawl 35ª and cause the ratchet wheel 38 to be rotated through a further eighteen degrees in an anti-clockwise direction, thus remaking the contacts 20, 21 for the power coil as required and in addition making the line contacts 22 and 23, at the bottom of the box. In this position the circuits of the electro-pneumatic valves 14 of the appropriate doors for the direction of running are completed, and the apparatus then functions to open the entrance door and, if the treadle switch 16 is closed, the exit door, substantially as in the above cited patent, the circuits being as follows:—For the entrance door, from source of supply, contacts 23, 22, change-over switch 15 at the left of the diagram Fig. 1, the electro-pneumatic valve 14 of the entrance door engine shown towards the bottom left-hand corner of the figure and thence to earth or negative. In the case of the exit door the circuit is the same except that from the change-over switch 15 the current flows to the appropriate treadle switch 16 and, if and when the latter is closed, to the electro-pneumatic valve 14 of the exit door engine 1 shown towards the bottom right-hand corner of the diagram, and thence to earth or to the common negative. On the magnets of the electro-pneumatic valves 14 being energized the valve pullers 3 operate the valves 2 so that the latter admit compressed air to the appropriate side of the door engines and open the doors as will be well understood. To close the doors the controller is moved into the power position and the coil 17ª is energized thus moving the drum 39 to break the circuit at contacts 22, 23 and de-energize the electro-magnets of the valves 14, whereupon the valve pullers 3 will move the valves 2 to position to cause the exhaust of the compressed air previously admitted to the door engines 1, and admit compressed air to the opposite side of the engines causing the latter to close the doors. It will be understood that the treadle switch 16 is closed only when a passenger is standing on the usual treadle plate adjacent the exit door of the vehicle. Unless the switch 16 is closed the action of the driver to open the entrance door will not cause opening of the exit door. It will be evident from the above that if it is desired to move the controller from the brake position directly to the power position (as in the case of the car having stopped for traffic reasons where it is not desired to take up or set down passengers) the cycle of events will take place so quickly that the valves 14 will not operate to open the doors; when it is desired to open the doors for the admission of passengers the controller handle will be moved from the brake position to, and be left in, the off position.

The interlocking drum switch is of simple construction comprising a drum 18 the spindle 49 of which is operatively connected to the lower end of the controller spindle or drum shaft by means of a slotted collar 50, or if not convenient to place the spindle 49 of the drum in exact alignment with the controller shaft the said connection may be through an "Oldham" coupling or the like. The contacts 45, 47 may be of copper and are fixed to the drum 18 which is of fibre or other suitable insulating material and the said contacts are made of such a length as to enable the various contacts to be made with the requisite movements of the master controller handle.

The circles marked 25 in Fig. 1 indicate the position of the driver of the car.

It will be understood that in order to comply with any safety regulations a dead man's handle of known character may be furnished in connection with the controller handle.

The invention is not confined to electric braking systems so long as the necessary extra movement of the controller handle is possible to provide for the control of contacts 46 by the segment 47 for the purpose of energizing and de-energizing the coil 17ᵇ.

The cock 13 in the exhaust pipe 12 constitutes an isolating cock and is provided for the same purpose as the cock 27 of the prior specification. When changing ends the driver would close the cock 13 in the exhaust pipe 12, thus preventing the exhaust of air from the door motors. He is then free to remove the trolley, or other current collecting apparatus, from the source of supply and to make any required change in the position of such current collecting apparatus. On the current collecting apparatus being again placed in a current collecting position, the driver would open the cock 13 and thereby restore the door control apparatus to its normal condition.

In details of construction of the apparatus employed variations may be made without departure from the invention.

What we claim is:—

1. In a door control system for vehicles, the combination with door operating motors for the entrance and exit doors of the vehicle, a fluid pressure source, connections between said source and motors including electro-magnetic valves, circuits for said valves including switches operated by the main power controller and an interlock switch included in said circuits and controlled by said switches whereby the exit door is opened automatically when the main power controller is turned to off position.

2. In a door control system for vehicles, the combination with door operating motors for the entrance and exit doors of the vehicle, a fluid pressure source, connections between said source and motors including electro-magnetic valves, circuits for said valves including switches operated by the main power controller, an interlock switch included in said circuits and controlled by said switches whereby the exit door is opened automatically when the main power controller is turned to off position, and an electromagnetic valve included in said connections whereby the doors are free to be opened by hand when there is a failure of current in said circuits.

3. In a door control system for vehicles, the combination with door operating motors for the entrance and exit doors of the vehicle, a fluid pressure source, connections between said source and motors including electro-magnetic valves, circuits for said valves including switches operated by the main power controller, an interlock switch included in said circuits and controlled by said switches whereby the exit door is opened automatically when the main power controller is turned to off position, and a fluid pressure operated means connected to said fluid pressure source and in said circuits whereby the doors are free for operation by hand when there is a failure of fluid pressure from the source.

4. In a door control system for vehicles, the combination with door operating motors for the entrance and exit doors of the vehicle, a fluid pressure source, connections between said source and motors including electro-magnetic valves, circuits for said valves including switches operated by the main power controller, an interlock switch included in said circuits and controlled by said switches whereby the exit door is opened automatically when the main power controller is turned to off position, and a treadle switch adjacent the exit door and included in said circuits whereby the exit door opens automatically upon the turning of the main power controller to off position and the pressure of a passenger on the treadle switch.

5. In a door control system for vehicles having entrance and exit doors, the combination including a pneumatic motor for each door, a source of fluid pressure, connections between said motors and said fluid pressure source including an electro-magnetic valve for each motor, circuits for said valves, an interlock switch in said circuits including two electro-magnets, and a drum switch arranged to be operated by the main power controller and connected to the electro-magnets of said interlock switch whereby when the main power controller is in on position the interlock switch causes the electro-magnetic valves to be de-energized to permit fluid pressure to be supplied to the motors to hold the doors closed and when the main power controller is in off position the interlock switch causes the electro-magnetic valves to be energized to permit fluid pressure to be supplied to said motors on the entrance doors to cause the doors to open.

6. In a door control system for vehicles having entrance and exit doors, the combination including a pneumatic motor for each door, a source of fluid pressure, connections between said motors and said fluid pressure source including an electro-magnetic valve for each motor, circuits for said valves, an interlock switch in said circuits including two electro-magnets, a drum switch arranged to be operated by the main power controller and connected to the electro-magnets of said interlock switch whereby when the main power controller is in on position the interlock switch causes the electro-magnetic valves to be de-energized to permit fluid pressure to be supplied to the motors to hold the doors closed and when the main power controller is in off position the interlock switch causes the electro-magnetic valves to be energized to permit fluid pressure to be supplied to said motors on the entrance doors to cause the doors to open, and a treadle operated switch in said circuits to cause the motor for the exit door to be supplied with fluid pressure upon the energization of the electro-magnetic valve therefor to cause the exit door to open when a passenger is on the treadle.

7. In a door control system for vehicles having an entrance and exit door on each side thereof, a motor for each door, a source of fluid pressure supply, a supply pipe from said source including a fluid pressure operated valve adapted to control the supply of fluid pressure to said motors, an electro-magnetic valve controlling said fluid pressure operated valve and constructed to cut off the supply of fluid pressure to the motors upon the interruption of the flow of current to said electro-magnetic valve, connections from said supply pipe to each of said motors, an electro-magnetic valve in each of said connections, an interlock switch for controlling the electro-magnetic valves in said connections, and a drum switch operated by the main power controller and circuits including all of said electro-magnetic valves, said interlock switch and said drum switch whereby the electro-magnetic valve is energized to permit the motor connected thereto to open the exit door when the main power controller is in off position.

8. In a door control system for vehicles having an entrance and exit door on each side thereof, a motor for each door, a source of fluid pressure supply, a supply pipe from said source including a fluid pressure operated valve adapted to control the supply of fluid pressure to said motors, an electro-magnetic valve controlling said fluid pressure operated valve and constructed to cut off the supply of fluid pressure to the motors upon the interruption of the flow of current to said electro-magnetic valve, connections from said supply pipe to each of said motors, an electro-magnetic valve in each of said connections, an interlock switch for controlling the electro-magnetic valves in said connections, a drum switch operated by the main power controller and circuits including all of said electro-magnetic valves, said interlock switch and said drum switch whereby the electro-magnetic valve is energized to permit the motor connected thereto to open the exit door when the main power controller is in off position, and a change-over switch for each end of the car in said circuits to adapt all of the said apparatus for use on either side of the car depending upon the position of the change-over switches.

9. In a door control system for vehicles having an entrance and exit door on each side thereof, a motor for each door, a source of fluid pressure supply, a supply pipe from said source including a fluid pressure operated valve adapted to control the supply of fluid pressure to said motors, an electro-magnetic valve controlling said fluid pressure operated valve and constructed to cut off the supply of fluid pressure to the motors upon the interruption of the flow of current to said electro-magnetic valve, connections from said supply pipe to each of said motors, an electro-magnetic valve in each of said connections, an interlock switch for controlling the electro-magnetic valves in said connections, a drum switch operated by the main power controller and circuits including all of said electro-magnetic valves, said interlock switch and said drum switch whereby the electro-magnetic valve is energized to permit the motor connected thereto to open the exit door when the main power controller is in off position, and a change-over switch for each end of the car in said circuits to adapt all of the said apparatus for use on either side of the car depending upon the position of the change-over switches, a single exhaust connection for all of said motors connected to said fluid pressure operated valve and a valve in said connection whereby the doors are maintained closed by closing said valve during interruption of the current.

In testimony whereof we affix our signatures.

HORACE REGINALD HOCKLEY.
HEDLEY BERTRAM WHITE.